United States Patent
Perera

(10) Patent No.: US 11,219,097 B2
(45) Date of Patent: Jan. 4, 2022

(54) SUBSEA DIRECT ELECTRICAL HEATING POWER SUPPLY SYSTEM, DIRECT ELECTRICAL HEATING SYSTEM AND METHOD OF OPERATING A SUBSEA DIRECT ELECTRICAL HEATING POWER SUPPLY SYSTEM

(71) Applicant: SIEMENS ENERGY AS, Oslo (NO)

(72) Inventor: Aravinda Perera, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 317 days.

(21) Appl. No.: 16/430,653

(22) Filed: Jun. 4, 2019

(65) Prior Publication Data

US 2019/0373677 A1 Dec. 5, 2019

(30) Foreign Application Priority Data

Jun. 5, 2018 (EP) ..................................... 18176118

(51) Int. Cl.
*H05B 1/02* (2006.01)
*F16L 53/38* (2018.01)
(Continued)

(52) U.S. Cl.
CPC .......... *H05B 1/0244* (2013.01); *E21B 36/04* (2013.01); *F16L 53/38* (2018.01); *F16S 5/00* (2013.01); *H05B 3/42* (2013.01); *H02M 5/04* (2013.01)

(58) Field of Classification Search
CPC . E21B 36/04; F16L 53/37; F16L 53/38; F16S 5/00; H02M 5/04; H05B 1/0244; H05B 2214/03; H05B 3/0023; H05B 3/42
(Continued)

(56) References Cited

U.S. PATENT DOCUMENTS 9,732,589 B1 * 8/2017 Hajiaghajani ............ H05B 6/06
9,876,347 B2 * 1/2018 Bousfield, III ......... H02M 1/32
(Continued)

FOREIGN PATENT DOCUMENTS

| EP | 2324550 A1 | 5/2011 |
| EP | 2764599 A2 | 8/2014 |
| EP | 2796760 A1 | 10/2014 |

OTHER PUBLICATIONS

European Search Report 18176118.0 dated Nov. 15, 2018.

*Primary Examiner* — Dana Ross
*Assistant Examiner* — Joseph W Iskra
(74) *Attorney, Agent, or Firm* — Wolter Van Dyke Davis, PLLC

(57) ABSTRACT

A subsea direct electrical heating power supply system includes at least one input device adapted to couple the direct electrical heating power supply system to a power supply and a subsea variable speed drive, for receiving electrical power from the at least one input device and for providing an AC output, including a plurality of series-connected power cells. Each power cell includes an inverter and a bypass device to selectively bypass the power cell. The system further includes an adjustable subsea capacitor connected to the AC output of the subsea variable speed drive; an output device adapted to couple the direct electrical heating power supply system to a subsea pipeline section; and a controller, adapted to adjust the capacitance of the adjustable subsea capacitor such that upon the system output voltage being reduced, the current output by the direct electrical heating power supply system is increased.

17 Claims, 2 Drawing Sheets

(51) Int. Cl.
   *E21B 36/04* (2006.01)
   *F16S 5/00* (2006.01)
   *H05B 3/42* (2006.01)
   *H02M 5/04* (2006.01)
(58) Field of Classification Search
   USPC .......................................................... 219/490
   See application file for complete search history.

(56) References Cited

U.S. PATENT DOCUMENTS

| | | | |
|---|---|---|---|
| 2015/0122362 A1* | 5/2015 | Haugan | H02M 5/4585 138/33 |
| 2015/0200609 A1* | 7/2015 | Hytten | H05B 3/02 219/488 |

* cited by examiner

SUBSEA DIRECT ELECTRICAL HEATING POWER SUPPLY SYSTEM, DIRECT ELECTRICAL HEATING SYSTEM AND METHOD OF OPERATING A SUBSEA DIRECT ELECTRICAL HEATING POWER SUPPLY SYSTEM

PRIORITY STATEMENT

The present application hereby claims priority under 35 U.S.C. § 119 to European patent application number EP18176118.0 filed Jun. 5, 2018, the entire contents of which are hereby incorporated herein by reference.

FIELD

Embodiments of the invention generally relate to a subsea direct electrical heating power supply system and a method of operating such a system. Embodiments of the invention further generally relate to a subsea direct electrical heating power supply system.

BACKGROUND

Hydrocarbon flow is a key concern in subsea hydrocarbon production. Traditionally chemicals have been injected to prevent hydrate forming. More recently pipeline heating systems and in particular direct electric heating (DEH) systems have been developed in order to avoid the risks and cost associated with transporting chemicals to the wellhead and injecting them into the process fluid.

Early DEH systems such as disclosed in European patent application EP 2 324 550 utilize a topside power supply for providing electrical power to the pipeline section to be heated. This approach works well for short and medium step-outs but has disadvantages at longer step-outs, for example because of losses that occur over the length of the supply lines.

In more recent systems such as disclosed in European patent application EP 2 764 599 power is therefore provided to the sea floor using a subsea power cable adapted to be coupled to a three phase electric power source for providing three phase electric power to a subsea location and two or more subsea direct electric heating (DEH) modules, each module being provided for heating a different pipeline section of the subsea pipeline. The subsea DEH modules are adapted to be installed subsea at different subsea locations, for example in proximity to the pipeline section to be heated by the respective subsea DEH module. Each such DEH module may comprise a compensation unit adapted to compensate for reactive power that may lead to a reduced power factor. The compensation unit can be adapted to compensate for this reduced power factor and may comprise a capacitance, the value of which can be controlled, for example, in accordance with a control signal. The compensation unit may be adapted to allow an on-load control of the capacitance value. The capacitance may be implemented by way of a capacitor bank and may comprise two or more capacitors being connected in parallel, and switches for connecting or disconnecting the capacitors, the switches being controllable in accordance with the control signal for adjusting the value of the capacitance.

The system disclosed in EP 2 764 599, see FIGS. 2 and 3, uses a common supply cable 41 to power each DEH module, and transformers 13 are arranged in each DEH module 10 to downconvert the high transport voltage to a voltage compatible with the single-phase loads 21, 22, 23. Adapting the AC frequency is only possible for the entire system 100. Consequently the frequency cannot be adapted individually for the different DEH modules 10.

SUMMARY

At least one embodiment of the present invention provides an improved pipeline direct electrical heating power supply system.

In accordance with a first embodiment of the present invention there is provided a subsea direct electrical heating power supply system for providing electrical power for heating a subsea pipeline section. The subsea direct electrical heating power supply system comprises input device(s) adapted to couple the direct electrical heating power supply system to a power supply.

Thus, at least one embodiment of the inventive subsea direct electrical heating power supply system in its most generic form does not comprise a power source as such but provides an adaptation between a power source and a subsea pipeline section.

The subsea direct electrical heating power supply system of at least one embodiment further comprises a subsea variable speed drive for receiving electrical power from the input device(s) and for providing an AC output, the subsea variable speed drive comprising a plurality of series-connected power cells, each power cell comprising an inverter and a bypass device to selectively bypass the power cell. A surface-use variable speed drive comprising a plurality of series-connected power cells, each power cell comprising an inverter and a bypass device to selectively bypass the power cell, is for example known from granted U.S. Pat. No. 9,876,347 (the entire contents of which are hereby incorporated herein by reference), particularly FIG. 1 and accompanying description.

The subsea direct electrical heating power supply system of at least one embodiment of the present invention further comprises an adjustable subsea capacitor connected to the AC output of the subsea variable speed drive and output device(s) adapted to couple the direct electrical heating power supply system to a subsea pipeline section. The subsea direct electrical heating power supply system further comprises a controller adapted to adjust the capacitance of the adjustable subsea capacitor such that if the system output voltage is reduced as a result of bypassing one or more power cells the current output by the direct electrical heating power supply system is increased.

In accordance with another embodiment of the present invention, there is provided a subsea direct electrical heating power supply system for providing electrical power for heating a subsea pipeline section, comprising:

at least one input device, adapted to couple the direct electrical heating power supply system to a power supply;

a subsea variable speed drive to receive electrical power from the at least one input device and to provide an AC output, the subsea variable speed drive including a plurality of series-connected power cells, a power cell of the plurality of series-connected power cells, including an inverter and a bypass device to selectively bypass the power cell;

an adjustable subsea capacitor connected to the AC output of the subsea variable speed drive;

an output device, adapted to couple the subsea direct electrical heating power supply system to a subsea pipeline section; and a controller, adapted to adjust capacitance of the adjustable subsea capacitor to, upon a system output voltage being reduced as a result of bypassing one or more power cells of the plurality of series-connected power cells, increase a current output by the subsea direct electrical heating power supply system.

In accordance with another embodiment of the present invention there is provided a direct electrical heating system comprising a power supply, a subsea pipeline section and a subsea direct electrical heating power supply system according to the present invention's first embodiment.

In accordance with yet another embodiment of the present invention, there is provided a method of operating a subsea direct electrical heating power supply system comprising a controller, a subsea variable speed drive comprising a plurality of series-connected power cells, each power cell comprising an inverter and a bypass device to selectively bypass the power cell, and an adjustable subsea capacitor connected to an AC output of the subsea variable speed drive. The method comprises, through operation of the controller, monitoring the condition of the power cells and upon detecting a faulted power cell, activating this power cell's bypass device. The method further comprises increasing the output current by adjusting the adjustable subsea capacitor and adjusting the output frequency so as to at least partially compensate for the power factor change caused by the adjusting of the adjustable subsea capacitor.

In accordance with yet another embodiment of the present invention, there is provided a method of operating a subsea direct electrical heating power supply system including a controller, a subsea variable speed drive including a plurality of series-connected power cells wherein each power cell of the plurality of series-connected power cells includes an inverter and a bypass device to selectively bypass the power cell, and an adjustable subsea capacitor connected to an AC output of the subsea variable speed drive, the method comprising, through operation of the controller:

monitoring a condition of the plurality of series-connected power cells;

activating, upon detecting a fault in a power cell of the plurality of series-connected power cells, a bypass device of the power cell;

increasing output current by adjusting the adjustable subsea capacitor; and adjusting an output frequency, to at least partially compensate for a power factor change caused by the adjusting of the adjustable subsea capacitor.

BRIEF DESCRIPTION OF THE DRAWINGS

The present invention will now be described in more detail with reference to example embodiments and to the accompanying drawings.

DETAILED DESCRIPTION OF THE EXAMPLE EMBODIMENTS

Figure 1:
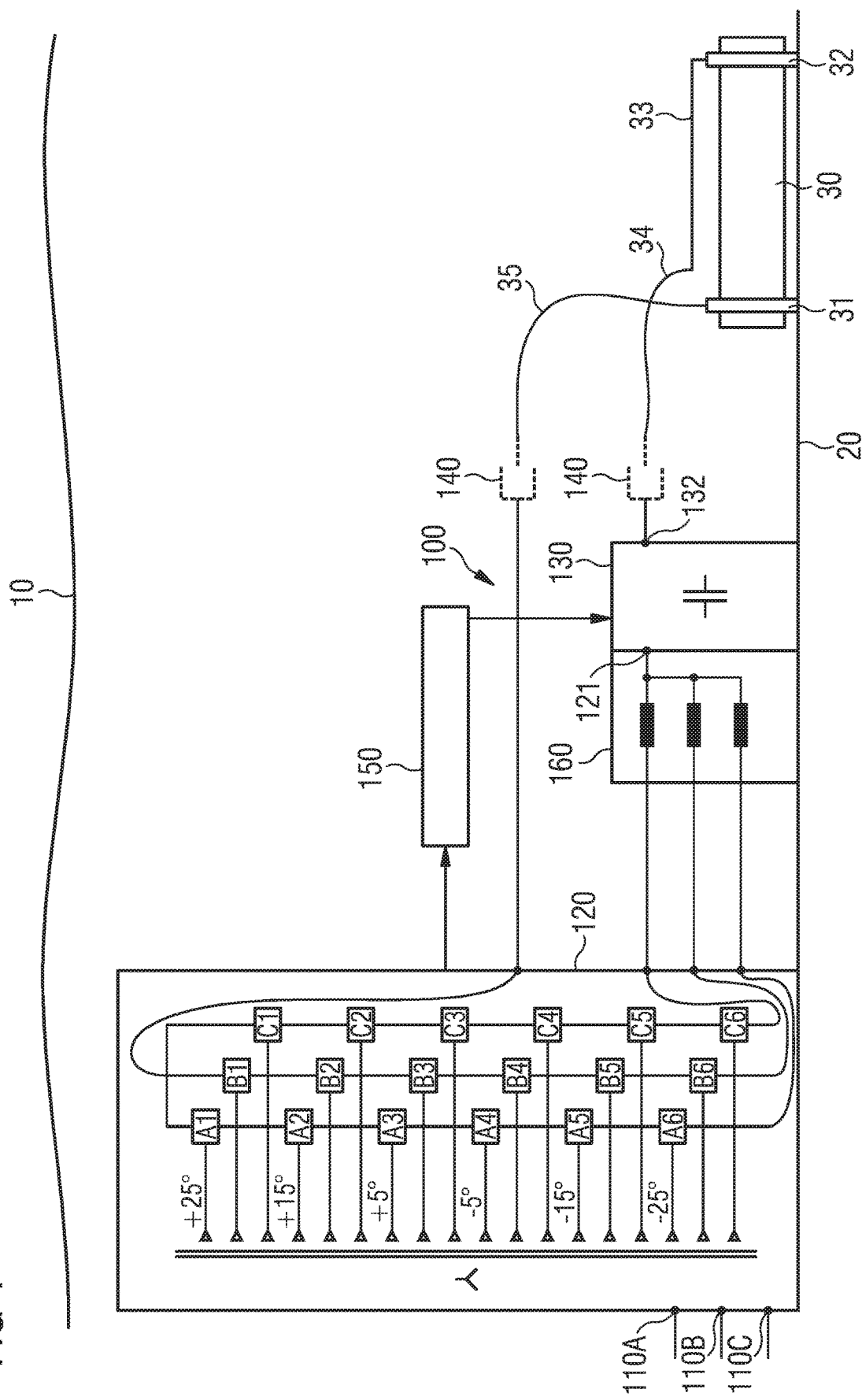
FIG. 1 shows a schematic representation of a subsea direct electrical heating power supply system for providing electrical power for heating a subsea pipeline section according to an embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

To let those skilled in the art better understand the technical solution of the present invention, the following will clearly and completely describe the technical solution in the embodiments of the present invention in combination with the drawings in the embodiments of the present invention. Obviously, the embodiments described are only a part, but not all of the embodiments of the present invention. All other embodiments obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. These terms are only used to distinguish one element from another. It should be understood that the data used in such a way can be interchanged as appropriate so that the described embodiments of the present invention can be implemented in an order other than that shown or described here. As used herein, the term "and/or," includes any and all combinations of one or more of the associated listed items. The phrase "at least one of" has the same meaning as "and/or". In addition, the terms "comprise" and "have" and their variants are intended to cover non-exclusive inclusions. For example, the process or method comprising a series of steps or the system, product or equipment comprising a series of modules or units are unnecessarily limited to those clearly-listed steps or modules or units, but can comprise other steps or modules or units which are not clearly listed or are intrinsic to the process, method, product or equipment.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In accordance with a first embodiment of the present invention there is provided a subsea direct electrical heating power supply system for providing electrical power for heating a subsea pipeline section. The subsea direct electrical heating power supply system comprises an input device adapted to couple the direct electrical heating power supply system to a power supply.

Thus, at least one embodiment of the inventive subsea direct electrical heating power supply system in its most generic form does not comprise a power source as such but provides an adaptation between a power source and a subsea pipeline section.

The subsea direct electrical heating power supply system of at least one embodiment further comprises a subsea variable speed drive for receiving electrical power from the input device and for providing an AC output, the subsea variable speed drive comprising a plurality of series-connected power cells, each power cell comprising an inverter and a bypass device to selectively bypass the power cell. A surface-use variable speed drive comprising a plurality of series-connected power cells, each power cell comprising an inverter and a bypass device to selectively bypass the power cell, is for example known from granted U.S. Pat. No. 9,876,347 (the entire contents of which are hereby incorporated herein by reference), particularly FIG. 1 and accompanying description.

The subsea direct electrical heating power supply system of at least one embodiment of the present invention further comprises an adjustable subsea capacitor connected to the AC output of the subsea variable speed drive and output device(s) adapted to couple the direct electrical heating power supply system to a subsea pipeline section. The subsea direct electrical heating power supply system further comprises a controller adapted to adjust the capacitance of the adjustable subsea capacitor such that if the system output voltage is reduced as a result of bypassing one or more power cells the current output by the direct electrical heating power supply system is increased.

In an example embodiment of the present invention, the power cells' bypass devices are further adapted to de-bypass the power cell and the controller is further adapted to adjust the capacitance of the adjustable subsea capacitor such that if the system output voltage is increased as a result of de-bypassing one or more power cells the current output by the direct electrical heating power supply system is decreased.

In a further preferred embodiment of the present invention, the controller is further adapted to adjust the frequency of the AC output of the variable speed drive if the capacitance of the adjustable subsea capacitor is adjusted.

In a further preferred embodiment of the present invention, the controller is further adapted to adjust the frequency such that if the capacitance of the adjustable subsea capacitor is adjusted the power factor change of the electrical circuit comprising the subsea pipeline section and the adjustable subsea capacitor caused by the adjusting of the adjustable subsea capacitor is at least partially compensated.

In a further preferred embodiment of the present invention, the subsea variable speed drive is adapted to provide an AC three-phase output and comprises a plurality of series-connected power cells for each of the three phases and a three-phase to one-phase converter is provided for converting the three-phase output of the three-phase variable speed drive to a one-phase AC output.

In accordance with another embodiment of the present invention there is provided a direct electrical heating system comprising a power supply, a subsea pipeline section and a subsea direct electrical heating power supply system according to the present invention's first embodiment.

In a preferred embodiment of the invention the power supply is a three-phase AC power supply. In another preferred embodiment the power supply is a DC power supply.

In accordance with yet another embodiment of the present invention, there is provided a method of operating a subsea direct electrical heating power supply system comprising a controller, a subsea variable speed drive comprising a plurality of series-connected power cells, each power cell comprising an inverter and a bypass device to selectively bypass the power cell, and an adjustable subsea capacitor connected to an AC output of the subsea variable speed drive. The method comprises, through operation of the controller, monitoring the condition of the power cells and upon detecting a faulted power cell, activating this power cell's bypass device. The method further comprises increasing the output current by adjusting the adjustable subsea capacitor and adjusting the output frequency so as to at least partially compensate for the power factor change caused by the adjusting of the adjustable subsea capacitor.

Power cell fault types and their handling are well known to those with skills in the art and for example described in detail in U.S. Pat. No. 9,876,347 (the entire contents of which are hereby incorporated herein by reference), in particular in the description column 5 line 15 to column 9 line 63, incorporated by reference herein.

In a preferred embodiment the method further comprises, through operation of the controller, upon detecting the cessation of a fault in a power cell, deactivating this cell's bypass device and decreasing the output current by adjusting the adjustable subsea capacitor, and further adjusting the output frequency so as to at least partially compensate for the power factor change caused by the adjusting of the adjustable subsea capacitor.

The method, when the variable speed drive is adapted to provide an AC three-phase output and comprises a plurality of series-connected power cells for each of the three phases, further comprises in a preferred embodiment, through operation of the controller, upon detecting a faulted power cell in any one of the three phases, activating this power cell's bypass device and the bypass devices of one power cell in each of the other two phases such that the resulting series of connected power cells is functionally equivalent for all three phases.

A key advantage of at least one embodiment of the present invention is that it ensures maximum available power output in case of a power cell fault if a variable speed drive comprising a plurality of series-connected power cells is deployed. Note that in many three-phase configurations the fault of one power cell in one of the three phases requires the bypassing of the corresponding (non-faulted) power cells in the other two phases. In an example variable speed drive employing 6 power cells per phase the maximum output voltage thus drops by about 18% if one cell faults, resulting in a corresponding drop of the supply system's power output. This drop in power output is prevented or mitigated by providing an adjustable capacitance in the output path and adjusting the same such that the output current is increased. In advanced configurations the power factor change caused by adjusting the capacitance is prevented or mitigated by adjusting the supply system output frequency, preferably through controlling the subsea variable speed drive accordingly.

The system controller may be adapted such that the output power is kept constant or at least as close as possible to a preferred value.

Another advantage of at least one embodiment of the present system is that capacitances of the cable connecting the power supply system to the pipeline section can be compensated by the controller.

Yet another advantage of at least one embodiment lies therein that deviations in the inductive characteristics of the pipeline section from the projected characteristics, for example caused by the operating temperature or the process medium or variations of wall strengths and material over the length of the pipeline section, can be compensated by the controller.

Although specific features are described in the above summary and the following detailed description in connection with specific embodiments and aspects of the present invention, it is to be understood that the features of the embodiments and aspects may be combined with each other unless specifically noted otherwise.

FIG. 1 shows a subsea direct electrical heating (DEH) power supply system 100 for providing electrical power for heating a subsea pipeline section 30 arranged subsea on the seafloor 20 below waterline 10. The DEH power supply system 100 comprises an input 110 which in the example shown in FIG. 1 is a three-phase input comprising the phases A, B, C. In other embodiments the power input to DEH power supply system 100 may be a single phase AC input or a DC input.

A power supply (not shown) which is either a three phase or a single phase AC or a DC power supply provides electrical power to the DEH power supply system 100 via corresponding input terminals 110. Preferably the power supply is also located subsea and may for example be a subsea umbilical termination assembly (SUTA) or any other surface-powered subsea power distribution unit.

The power received from the power supply is fed via terminals 110 to subsea variable speed drive 120. Subsea variable speed drive 120 in the preferred embodiment is adapted to receive three phase AC but may in other embodiments be adapted to receive single phase AC or DC via corresponding input circuitry, as is well known in the art. Subsea variable speed drive 120 comprises a plurality of power cells A1 . . . A6 connected in series to drive at least a single phase AC output. Preferably the subsea variable drive 120 provides a three phase AC output and comprises a plurality of power cells A1 . . . A6, B1 . . . B6, C1 . . . C6 for each of the three phases.

Each of the power cells comprises a bypass device to selectively bypass the power cell such as for example known from granted U.S. Pat. No. 9,876,347. The series of power cells thus provides two advantages: firstly, each power cell comprising power electronics such as an IGBT may be selected to only drive a fraction of the system's projected output voltage, and secondly, a limited number of faulted power cells will not render the entire variable speed drive inoperable. This is of particular advantage in the subsea field where the recovery of faulty or failed components is extremely difficult.

The subsea variable speed drive 120 is adapted to provide a single phase AC output at an output terminal 121. This may be accomplished by either setting up the subsea variable speed drive 120 such that it provides a single phase AC output or, where subsea variable speed drive 120 provides a three phase AC output, by providing a three-phase to one-phase converter 160 for converting the three-phase output of the three-phase variable speed drive to a one-phase AC output 121.

Note that the techniques of providing and operating the variable speed drive 120 and, optionally, the three-phase to one-phase converter 160 which may include a line reactors and symmetrization components are well known in the art and thus a detailed description of their provisioning and operation is omitted here.

The single phase AC output provided at terminal 121 is received by an adjustable subsea capacitor 130. The adjustable subsea capacitor 130 may be provided in series to or in parallel with the load coupled to terminals 140 of the DEH power supply system 100, the load generally comprising the subsea pipeline section 30 and cables 34, 35 which provide the connection between the subsea pipeline section 30 and the DEH power supply system 100.

In operation, a controller 150 of the DEH power supply system 100 is adapted or configured to adjust the capacitance of the adjustable subsea capacitor 130 such that if the system output voltage is reduced as a result of bypassing one or more power cells A1 . . . A6 the current output by the DEH power supply 100 system is increased such that the total power provided at terminals 140 is kept constant. Where the number of bypassed cells is such that the power provided at terminals 140 cannot be kept constant the controller 150 will adjust the DEH power supply 100 system and in particular the adjustable capacitor 130 such that the power output is maximized and thus as close as possible to the value provided by the system when no power cell bypasses are activated.

Reversely, if a previously bypassed power cell is de-bypassed (i.e. reconnected by deactivating the bypass) upon, for example, abatement of a fault condition, the controller 150 may be further adapted to adjust the capacitance of the adjustable subsea capacitor 130 such that if the system output voltage is increased as a result of de-bypassing (i.e. reconnecting) one or more power cells the current output by the DEH power supply system 100 is decreased.

Typically the power factor of the overall system will change if the capacitance of adjustable subsea capacitor 130 is adjusted. While this may be acceptable in some configurations, in a preferred embodiment the controller is further adapted to adjust the frequency of the AC output of the variable speed drive 120 if the capacitance of the adjustable subsea capacitor 130 is adjusted, preferably such that the power factor change of the electrical circuit comprising the subsea pipeline section 30 and the adjustable subsea capacitor 130 caused by the adjusting of the adjustable subsea capacitor 130 is completely or at least partially compensated. Ideally the power output by DEH power supply system is kept constant and a power factor of one or very close to one is maintained through the operation of controller 150.

For example, in a three phase variable speed drive 120, a single power cell fault often requires the controller of variable speed drive 120 (which may be co-located or integrated with controller 150) to activate the bypass device (s) of the faulty power cell and also the bypass device(s) of the same level power cells in the other two phases, for example for to avoid internal currents that may occur if only the faulty power cell is bypassed. For example, a fault in power cell B2 may require the bypassing of power cell B2 and also of power cells A2 and C2, thereby reducing the maximum output voltage of the subsea variable speed drive 120 by $\frac{1}{6}$=17% in a six cell per phase configuration and thereby reducing the power output of DEH power supply system 100. As the power requirements of the pipeline section 30 are such that a reduced power will directly lead to a reduced pipeline temperature which in turn increases the risk of hydrate forming the controller 150 seeks to fully compensate the loss in maximum voltage by increasing the output current at terminals 140 by adjusting the capacitance of adjustable capacitor 130 accordingly.

In configurations where the capacitance of the adjustable capacitor is in series with the load the output current may be increased by increasing the capacitance.

This will in turn affect the power factor at terminals 140 which may be tolerable for some systems. In other systems the controller 150 is configured to adjust the frequency of the subsea variable speed drive 120 such that the power factor is restored to its previous value (often near 1) or a value as close as possible to the previous value when system operational boundaries prevent a full restoration. Where the adjustable capacitor 130 is in series with the load the power factor may be restored by decreasing the frequency when the capacitance of the adjustable capacitor is increased.

Controller 150 may in embodiments be a dedicated controller for adjusting the capacitance of the adjustable subsea capacitor 100 and as such may receive status information from or interact with a controller (not shown) of the subsea variable speed drive, the status information including information on the bypassing of cells. In other configurations controller 150 controls the entire system 100 including the bypassing and de-bypassing of power cells and other system parameters and comprises device(s) for determining power cell faults and device(s) for activating power cell bypass device(s). In such configurations the controller may further be adapted to detect the cessation of power cell faults and device(s) for de-bypassing power cells with ceased faults.

Depending on the bypass information received or otherwise available at controller 150 the controller 150 determines the effect the power cell unavailability on the output of variable speed drive 120, namely output voltage and output current and/or output electrical power of variable speed drive 120 at terminal 121 which is where single phase AC is provided to the variable capacitor 130. Note that in embodiments where the variable speed drive 120 outputs three-phase AC it needs to be converted to obtain single phase AC at terminal 121 for DEH purposes, for example by way of a three-phase to one-phase converter 160 as shown in FIG. 1. Such converter may of course be omitted in embodiments where the variable speed drive 120 directly outputs single phase AC.

Upon determining the effect the power cell unavailability has on the power output of variable speed drive 120 at terminal 121 the controller 150 will adjust the capacitance of adjustable capacitor 130 and preferably also the frequency of the AC output by variable speed drive 120, as discussed above. Note that it may not be possible to fully restore the power output of DEH power supply system at its output terminal 132 to its previous value, for example if multiple variable speed drive power cells are faulted. This is mainly because the remaining power cells have a current load limit which limits the current output by the variable speed drive 120 at terminal 121.

In the preferred embodiment the adjustable capacitor 130 is arranged in series with the DEH load 30. It may be arranged in parallel in other embodiments.

Towards the load 30 the example DEH power supply system 100 shown in FIG. 1 comprises two subsea connectors 140 wherein one connector is provided for connecting the system output terminal 132 via a first subsea power supply cable 34 to a piggy-back conductor 33 of the pipe section 30 terminating at a second terminal 32 of the pipe section 30 and wherein a further connector is provided for connecting the neutral conductor of the DEH power supply system 100 via a second subsea supply cable 35 to a first terminal 31 of the pipe section 30. Electrical power is thus provided between the two end terminals 31, 32 of pipe section 30 which comprises an electrically resistive element and typically is made of a conductive material such as steel, thereby achieving direct electrical heating of that subsea pipe section 30.

Figure 2:
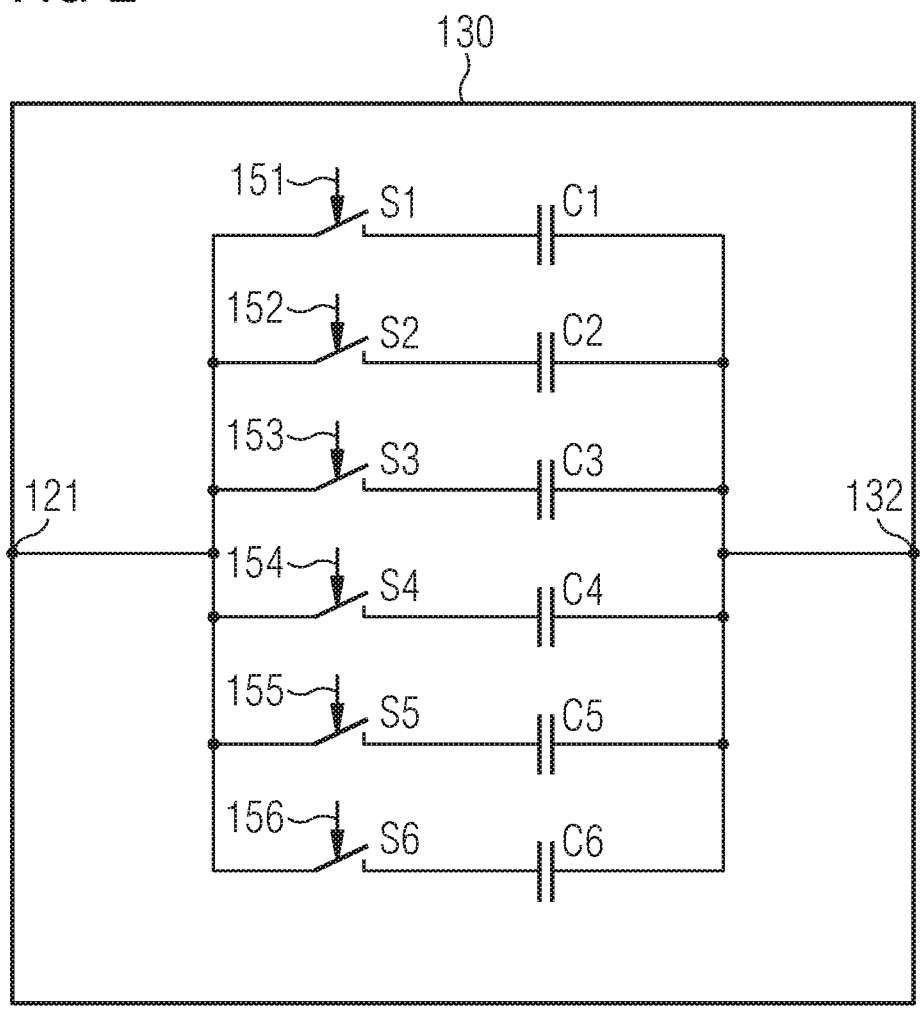
FIG. 2 shows an embodiment of a subsea adjustable capacitor.

Turning now to FIG. 2 there is shown an embodiment of an adjustable capacitor 130. Adjustable capacitor 130 comprises six capacitors C1 . . . C6. Note that the number six was chosen for illustrative purposes only and is not meant to be limiting. Also there is no relation between the number of power cells per phase in variable speed drive 120 and the number of capacitors in adjustable capacitor 130. One terminal of each capacitor C1 . . . C6 is connected to the adjustable capacitor's output terminal 132. The other terminal of each capacitor C1 . . . C6 is connected to a respective one of six switching elements S1 . . . S6 which selectively couples the respective capacitor to the adjustable capacitor's input terminal 121. Thus, by operating the switching devices S1 . . . S6 the capacitance of adjustable capacitor 130 can be adjusted.

In the preferred embodiment controller 150 provides six control signals 151 . . . 156 to the adjustable capacitor 130 wherein each of the control signals 151 . . . 156 is provided to a respective one of the six switching elements S1 . . . S6 which upon receiving a respective control signal connects or disconnects the respective capacitor C1 . . . C6 to/from input terminal 121.

In other embodiments adjustable capacitor 130 may comprise a separate controller (not shown) for receiving a control signal from DEH power supply system controller 150 and for correspondingly providing the six individual control signals 151 . . . 156.

Note that in the preferred embodiment of the invention, the capacitance is increased upon power cell bypass. That that at least one of the capacitors C1 . . . C6 will not be active in normal operation which provides a number of additional advantages for the operation of DEH power supply system 100. In embodiments the capacitor that is inactive in normal operation may be configured to be a reserve capacitor to be activated if any one of the active capacitors becomes inoperable, by operation of controller 150 or the adjustable capacitor's own controller. Additionally or alternatively the controller 150 or the adjustable capacitor's own controller may apply a cyclic (e.g. time controlled) activation/deactivation scheme for the capacitors C1 . . . C6 such that over time all capacitors are exposed to the same number of operation hours thereby extending the life of adjustable capacitor 130.

In some embodiments of the invention, the capacitances of capacitors C1 . . . C6 may be chosen to be equal which, for example, provides advantages during manufacturing and regarding the overall cost of the adjustable capacitor 130. In other embodiments the capacitances of the capacitors may be chosen to be different in order to allow greater flexibility in adjusting an adjusted total capacitance. For example, a first number of capacitors may be provided with a base capacitance, a second number of capacitors may be provided with double the base capacitance, and a third number of capacitors may be provided with four times the base capacitance.

In order to arrive at additional manufacturing and cost advantages the switching elements S1 . . . S6 in adjustable capacitor 130 may be the same as those used in subsea variable speed drive 120 for bypassing power cells, noting that the qualification and testing of any subsea component is a key cost driver and therefore using fewer individual parts is preferable.

Note that in embodiments of the invention, at least one power factor determination unit (not shown) is provided, for example at terminal 121 or 132 in order to more accurately determine the power factor and to provide a parameter representing a power factor measurement to the controller 150 for exercising control of the DEH power supply system 100 and the frequency of the subsea variable speed drive 120 in particular.

Note again that while the adjustable capacitor 130 has been shown to be arranged in series with load 30 it may also be arranged in parallel.

The components 120, 130, 150, 160 of subsea DEH power supply system 100 may be arranged inside enclosures (not shown) which may be pressure resistant subsea enclosures wherein an inside pressure of close to one atmosphere is maintained when subsea DEH power supply system 100 is installed subsea. Accordingly, standard electric components may be employed in such embodiments. However, since pressure resistant enclosures tend to be bulky, it may be preferable to provide pressure compensated enclosures for any or all of the components 120, 130, 150, 160 of subsea DEH power supply system 100. Such enclosures are typically filled with a dielectric liquid in which a pressure corresponding to the pressure outside the subsea DEH power supply system 100 prevails. The enclosure may then be constructed more compact and lightweight. The enclosure(s) for components 120, 130, 150, 160 of subsea DEH power supply system 100 can be adapted so that the subsea DEH power supply system 100 can be installed and operated at water depths of more than 100 m, more than 500 m or even more than 1000 m. Note that a mixture of pressure-resistant and pressure-compensated enclosures may be employed for the components 120, 130, 150, 160 of subsea DEH power supply system 100.

It should further be noted that the instructions for implementing the control processes, methods and/or techniques discussed herein may be provided on computer-readable storage media or memories, such as a cache, buffer, RAM, removable media, hard drive or other computer-readable storage media. Computer-readable storage media include various types of volatile and nonvolatile storage media. The functions, acts or tasks illustrated in the figures or described herein are executed in response to one or more sets of instructions stored in or on computer-readable storage media. The functions, acts or tasks described for example with reference to controller 150 are independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through communications lines comprised in an umbilical. In yet other embodiments, the instructions are stored within a given computer, CPU, or system.

While specific embodiments are disclosed herein, various changes and modifications can be made without departing from the scope of the invention. The embodiments are to be considered in all respects as illustrative and nonrestrictive, and all changes coming within the meaning and equivalency range of the appended claims are intended to be embraced therein.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A subsea direct electrical heating power supply system for providing electrical power for heating a subsea pipeline section, comprising:
   at least one input device, adapted to couple the subsea direct electrical heating power supply system to a power supply;
   a subsea variable speed drive to receive electrical power from the at least one input device and to provide an AC output, the subsea variable speed drive including a plurality of series-connected power cells, wherein each respective power cell of the plurality of series-connected power cells includes an inverter and a bypass device to selectively bypass the respective power cell;
   an adjustable subsea capacitor connected to the AC output of the subsea variable speed drive;

an output device, adapted to couple the subsea direct electrical heating power supply system to the subsea pipeline section; and a controller, adapted to adjust capacitance of the adjustable subsea capacitor to, upon a system output voltage being reduced as a result of bypassing one or more power cells of the plurality of series-connected power cells, increase a current output by the subsea direct electrical heating power supply system.

2. The subsea direct electrical heating power supply system of claim 1, wherein respective bypass devices of the plurality of series-connected power cells are further adapted to de-bypass the respective power cell and wherein the controller is further adapted to adjust the capacitance of the adjustable subsea capacitor to decrease, upon the system output voltage being increased as a result of de-bypassing one or more power cells, the current output by the subsea direct electrical heating power supply system.

3. The subsea direct electrical heating power supply system of claim 1, wherein the controller is further adapted to adjust frequency of an AC output of the subsea variable speed drive upon the capacitance of the adjustable subsea capacitor being adjusted.

4. The subsea direct electrical heating power supply system of claim 3,
wherein the controller is further adapted to adjust the frequency, upon the capacitance of the adjustable subsea capacitor being adjusted, to at least partially compensate for power factor change of an electrical circuit including the subsea pipeline section and the adjustable subsea capacitor, caused by adjusting of the adjustable subsea capacitor.

5. The subsea direct electrical heating power supply system of claim 1,
wherein the subsea variable speed drive is adapted to provide an AC three-phase output and includes a plurality of series-connected power cells for each of the three phases, and
wherein a three-phase to one-phase converter is provided to convert a three-phase output of the subsea variable speed drive to a one-phase AC output.

6. A direct electrical heating system comprising
a power supply,
a subsea pipeline section, and
the subsea direct electrical heating power supply system of claim 1.

7. The direct electrical heating system of claim 6,
wherein the power supply is a three-phase AC power supply.

8. The direct electrical heating system of claim 7,
wherein the power supply is a DC power supply.

9. A method of operating a subsea direct electrical heating power supply system including a controller, a subsea variable speed drive including a plurality of series-connected power cells wherein each respective power cell of the plurality of series-connected power cells includes an inverter and a bypass device to selectively bypass the respective power cell, and an adjustable subsea capacitor connected to an AC output of the subsea variable speed drive, the method comprising, through operation of the controller:
monitoring a condition of the plurality of series-connected power cells;
upon detecting a fault in a faulted power cell of the plurality of series-connected power cells, activating the bypass device of the faulted power cell;
increasing output current by adjusting the adjustable subsea capacitor; and
adjusting an output frequency, to at least partially compensate for a power factor change caused by the adjusting of the adjustable subsea capacitor.

10. The method of claim 9, further comprising, through operation of the controller:
upon detecting cessation of the fault in a previously faulted power cell of the plurality of series-connected power cells, deactivating the bypass device of the previously faulted power cell;
decreasing the output current by adjusting the adjustable subsea capacitor; and
adjusting the output frequency to at least partially compensate for the power factor change caused by the adjusting of the adjustable subsea capacitor.

11. The method of claim 9, wherein the subsea variable speed drive is adapted to provide an AC three-phase output and includes a plurality of series-connected power cells for each of three phases, the method further comprising, through operation of the controller:
upon detecting a faulted power cell in any one of the three phases, activating the bypass device of the faulted power cell and respective bypass devices of one respective power cell in each of the other two phases such that a resulting series of connected power cells is functionally equivalent for all three phases.

12. The subsea direct electrical heating power supply system of claim 2, wherein the controller is further adapted to adjust frequency of an AC output of the subsea variable speed drive upon the capacitance of the adjustable subsea capacitor being adjusted.

13. The subsea direct electrical heating power supply system of claim 12, wherein the controller is further adapted to adjust the frequency, upon the capacitance of the adjustable subsea capacitor being adjusted, to at least partially compensate for power factor change of an electrical circuit comprising the subsea pipeline section and the adjustable subsea capacitor, caused by adjusting of the adjustable subsea capacitor.

14. A direct electrical heating system comprising
a power supply,
a subsea pipeline section, and
the subsea direct electrical heating power supply system of claim 2.

15. The direct electrical heating system of claim 14, wherein the power supply is a three-phase AC power supply.

16. The direct electrical heating system of claim 15, wherein the power supply is a DC power supply.

17. The method of claim 9, wherein the subsea variable speed drive is adapted to provide an AC three-phase output and includes a plurality of series-connected power cells for each of three phases, the method further comprising, through operation of the controller:
upon detecting a faulted power cell in any one of the three phases, activating the bypass device of the faulted power cell and respective bypass devices of one respective power cell in each of the other two phases such that a resulting series of connected power cells is functionally equivalent for all three phases.

* * * * *